(12) United States Patent
Diaz et al.

(10) Patent No.: US 7,540,140 B1
(45) Date of Patent: Jun. 2, 2009

(54) SHACKLE APPARATUS

(76) Inventors: Carroll Diaz, 464 W. 47th St., Cut Off, LA (US) 70345; Derrick Prentice, 1300 Bayou Black Dr., Houma, LA (US) 70360

( * ) Notice: Subject to any disclaimer, the term of this patent is extended or adjusted under 35 U.S.C. 154(b) by 0 days.

(21) Appl. No.: 12/112,575

(22) Filed: Apr. 30, 2008

Related U.S. Application Data

(60) Provisional application No. 60/914,894, filed on Apr. 30, 2007.

(51) Int. Cl.
*F16G 15/04* (2006.01)
*F16G 13/06* (2006.01)

(52) U.S. Cl. .................. 59/86; 70/26; 70/28; 70/39; 70/52; 403/20; 403/154; 403/317; 403/326; 403/349

(58) Field of Classification Search .............. 59/85, 59/86; 70/26, 28, 39, 52; 403/20, 154, 317, 403/324, 325, 326, 349
See application file for complete search history.

(56) References Cited

U.S. PATENT DOCUMENTS

| | | | |
|---|---|---|---|
| 2,259,271 A | 10/1941 | Seay, Jr. | |
| 2,374,669 A | 5/1945 | DeQuick | |
| 3,604,227 A | 9/1971 | Athanason | |
| 4,068,960 A * | 1/1978 | Swager | 59/86 |
| 4,290,280 A | 9/1981 | Yun | |
| 4,881,387 A | 11/1989 | Kortenbrede | |
| 4,896,989 A * | 1/1990 | Swager | 403/154 |
| 5,046,881 A * | 9/1991 | Swager | 403/154 |
| 5,394,712 A | 3/1995 | Chou | |
| 5,398,529 A | 3/1995 | Goldman et al. | |
| 5,417,092 A | 5/1995 | Iu | |
| 5,640,861 A | 6/1997 | Chen | |
| 5,823,021 A | 10/1998 | Chang | |
| 5,850,751 A * | 12/1998 | Kuo | 70/26 |
| 6,023,927 A * | 2/2000 | Epstein | 59/86 |
| 6,430,975 B1 | 8/2002 | McDaid | |
| 6,584,815 B2 | 7/2003 | Bremicker | |
| 6,694,781 B1 | 2/2004 | Li | |
| 7,017,378 B2 | 3/2006 | Hsieh | |
| 7,389,659 B1 | 6/2008 | Diaz et al. | |
| 7,448,823 B2 * | 11/2008 | Silva | 403/349 |

* cited by examiner

*Primary Examiner*—David B Jones
(74) *Attorney, Agent, or Firm*—Garvey, Smith, Nehrbass & North, L.L.C.; Charles C. Garvey, Jr.; Seth M. Nehrbass

(57) ABSTRACT

An improved shackle assembly is disclosed that provides a bow having specially configured receptacle on one end portion that interlocks with a specially configured pin assembly. The pin assembly has locking members or lugs that move between locking and releasing positions. The locking lugs can be moved to a locking position or unlocked using a rotating end portion of the shaft opposite the receptacle.

20 Claims, 6 Drawing Sheets

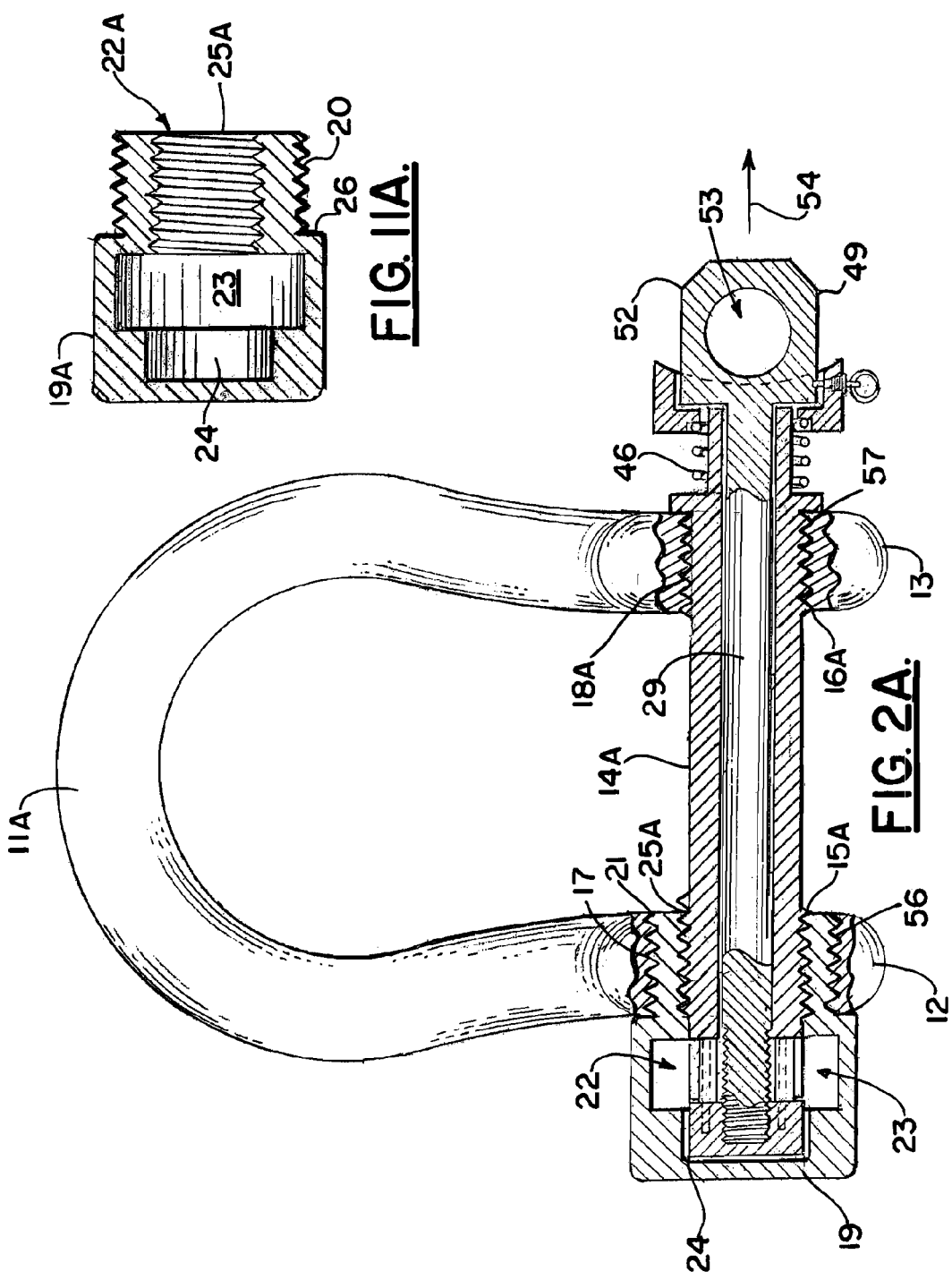

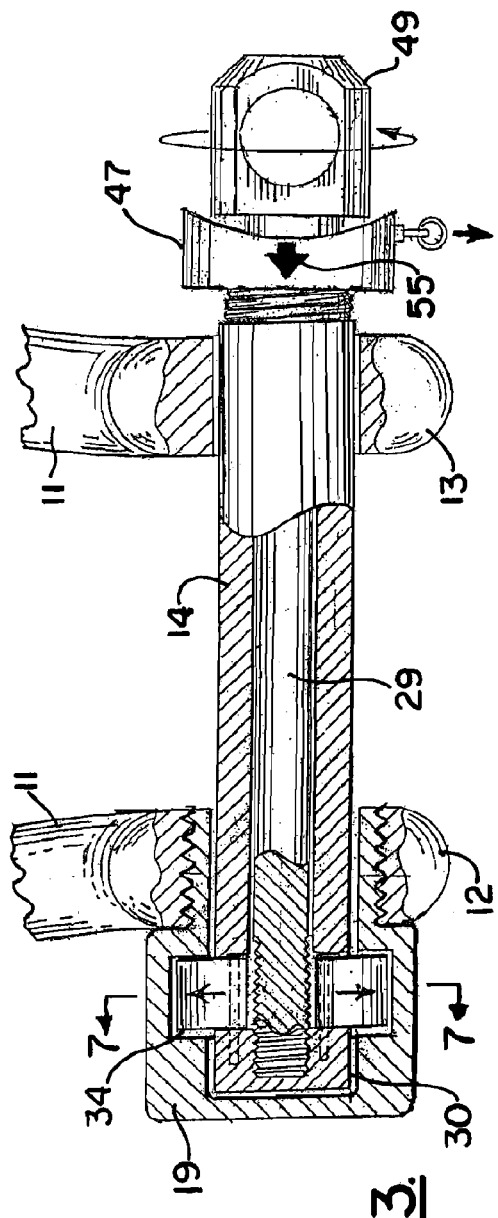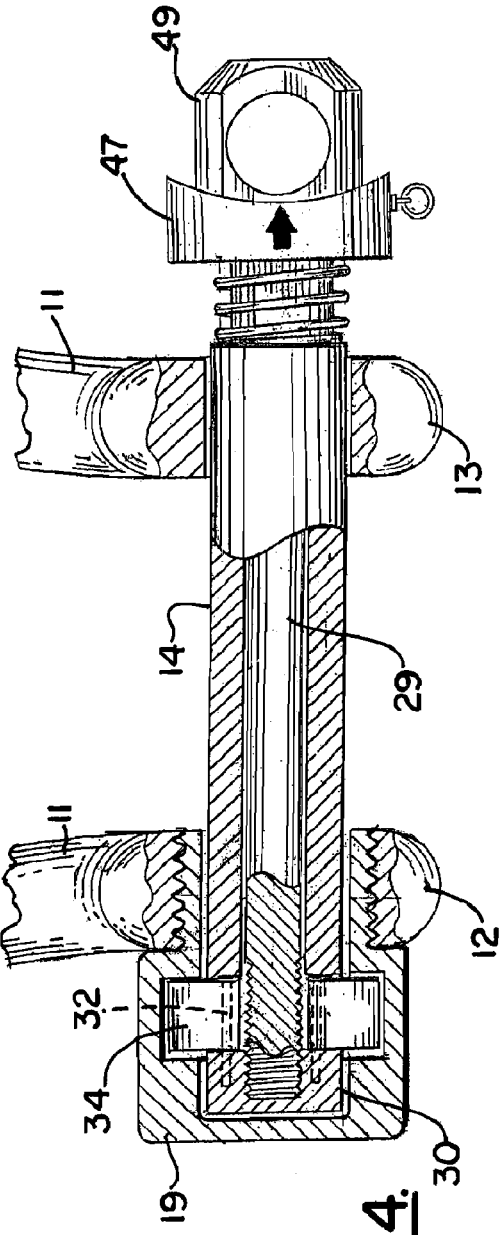

SHACKLE APPARATUS

CROSS-REFERENCE TO RELATED APPLICATIONS

Priority of U.S. Provisional Patent Application Ser. No. 60/914,894, filed Apr. 30, 2007, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to rigging for lifting of loads. More particularly, the present invention relates to an improved shackle apparatus that can be rigged to slings, lifting lines, or other rigging and wherein an interlocking arrangement is provided between the shackle bow portion and a pin assembly wherein connection of the pin assembly and bow is perfected by rotating a drive shaft to extend projecting members that engage a receptacle on one end of a shackle bow.

2. General Background of the Invention

Shackles have been used for many years as part of rigging for lifting items that are very heavy. Shackles are typically coupled to a lifting line of a lifting device such as a crane. Shackles can also be used to attach lifting lines to slings, to spreader bars, or to other devices that are used commonly in the rigging process.

One of the problems with shackles is that the pin which is attached to the bow using a threaded connection is easily disassembled, sometimes inadvertently.

BRIEF SUMMARY OF THE INVENTION

The present invention provides an improved shackle apparatus that has a bow with bow end portions. A pin assembly detachably connects to the bow, the pin assembly including a barrel having spaced apart ends, one that carries locking members. Each locking member is pivotally attached to a shaft. Each locking member has a projecting end portion that engages a recess of a barrel when the bow is to be locked to the pin assembly.

In the preferred embodiment, the locking members rotate upon the pins. In the preferred embodiment, the pinion gear rotates with the drive shaft, the drive shaft being rotatably attached to the two plates. Thus, the drive shaft and pinion gear are connected together and rotate together.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 2-2A are partial sectional views of the preferred embodiment of the apparatus of the present invention;

FIG. 3 is a partial sectional view of the preferred embodiment of the apparatus of the present invention;

FIG. 4 is another partial sectional view of the preferred embodiment of the apparatus of the present invention;

FIGS. 11-11A are fragmentary sectional views of the preferred embodiment of the apparatus of the present invention.

DETAILED DESCRIPTION OF THE INVENTION

Figure 10:
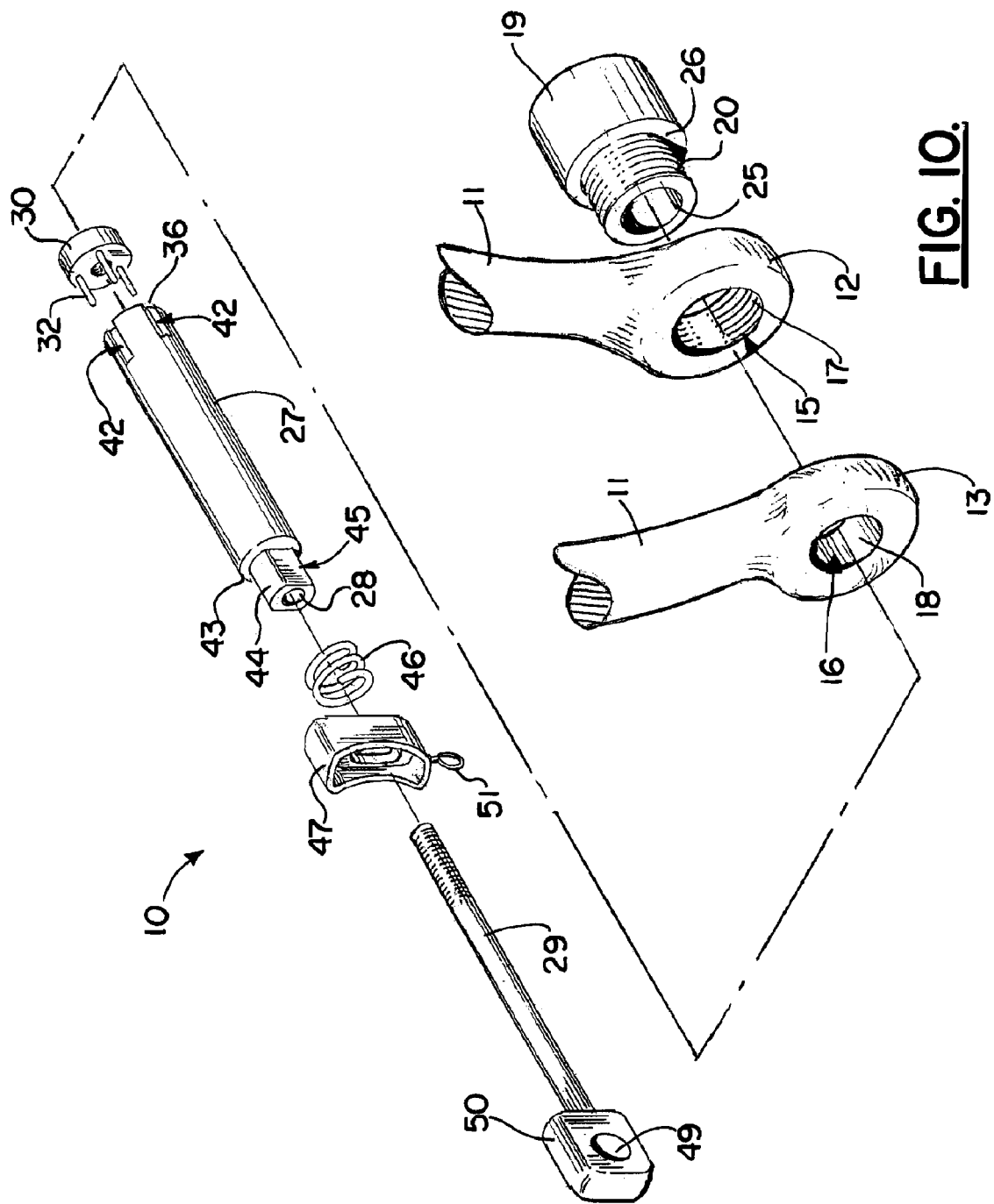
FIG. 10 is a partial exploded perspective view of the preferred embodiment of the apparatus of the present invention.

FIGS. 1-4 and 10 show the preferred embodiment of the apparatus of the present invention designated generally by the numeral 10. Shackle 10 includes a shackle bow 11 that can be generally u-shaped, providing bow ends 12, 13. A pin assembly 14 interlocks with bow 11 by extending through one pin opening 16 toward another pin opening 15 as shown in FIGS. 1-4. The bow end 12 provides opening 15. The bow end 13 provides opening 16. The opening 12 is internally threaded, providing internal threads 17. The opening 16 of end 13 is not threaded, providing a preferably cylindrically shaped internal surface 18 as shown in FIG. 10. Pin assembly 14 includes barrel 27.

Receptacle 19 is attached to bow end 12 using a threaded connection 20 for example. Receptacle 19 has an externally threaded section 20 that provides a hollowed interior 22 (see FIG. 1A). Hollowed interior 22 includes an enlarged diameter section 23 and a pair of smaller diameter sections 24, 25. An annular shoulder 26 is provided on receptacle 19 as shown in FIG. 10.

Figure 1:
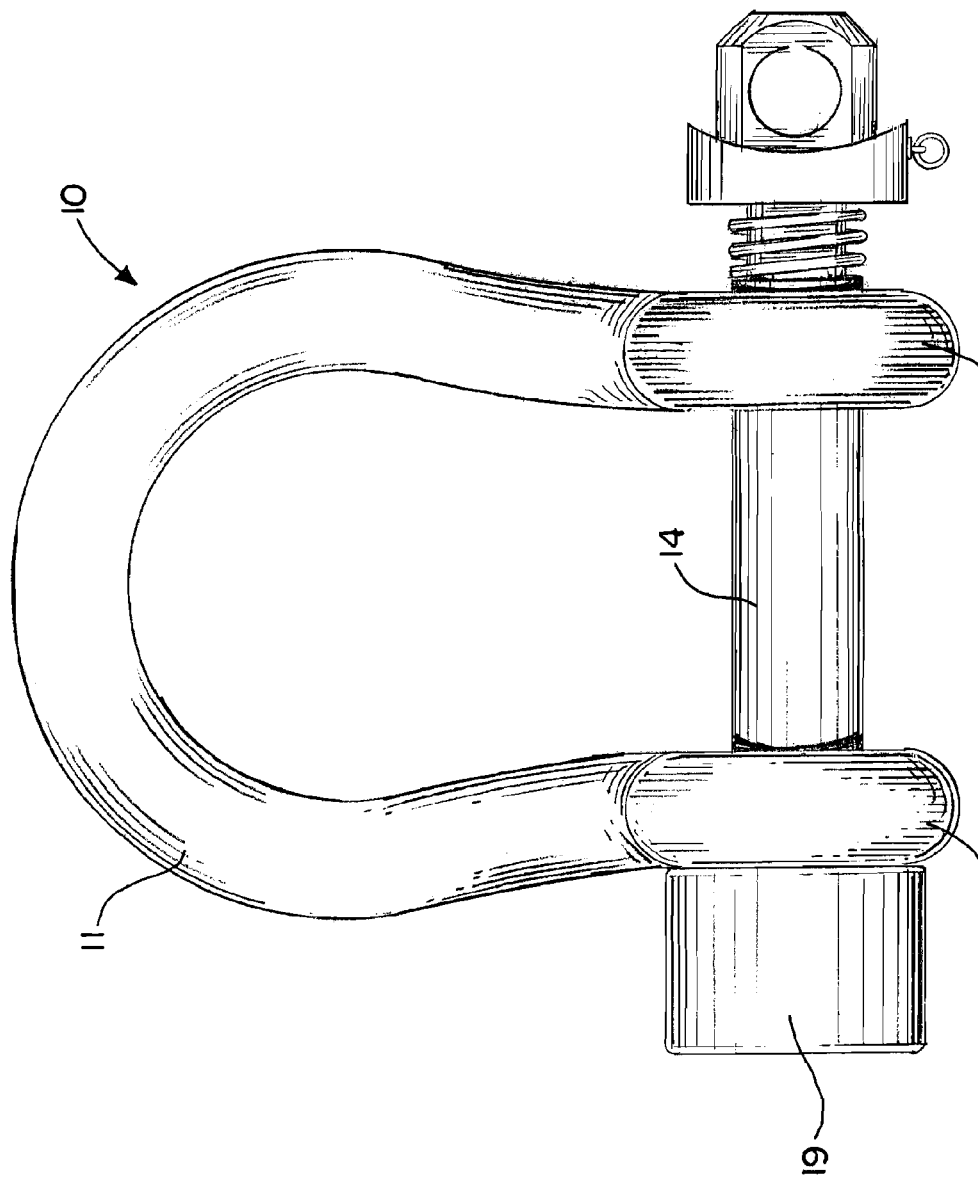
FIG. 1 is a plan view of the preferred embodiment of the apparatus of the present invention.
Figures 2, 11:
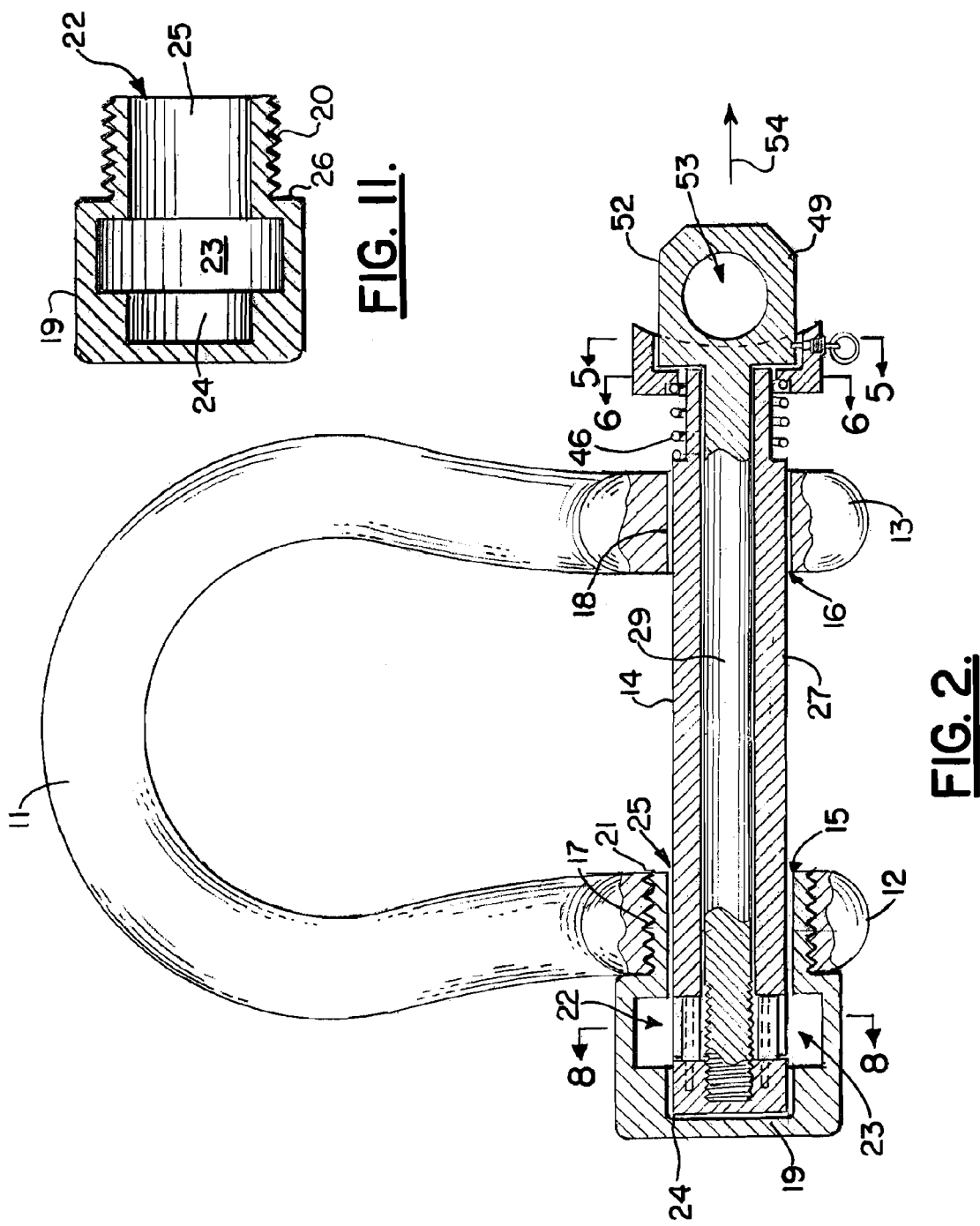
Figure 5:
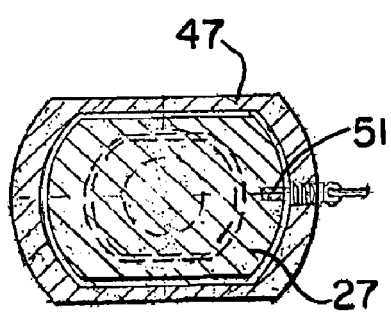
FIG. 5 is a sectional view taken along lines 5-5 of FIG. 2.
Figure 6:
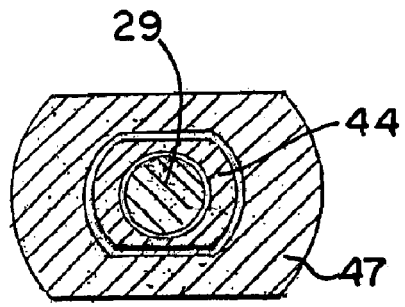
FIG. 6 is a sectional view taken along lines 6-6 of FIG. 2.

Pin assembly 14 provides pin barrel 27 that has a longitudinal open ended bore 28. Shaft 29 occupies longitudinal bore 28 in use as is shown in FIGS. 2-4.

Figure 9:
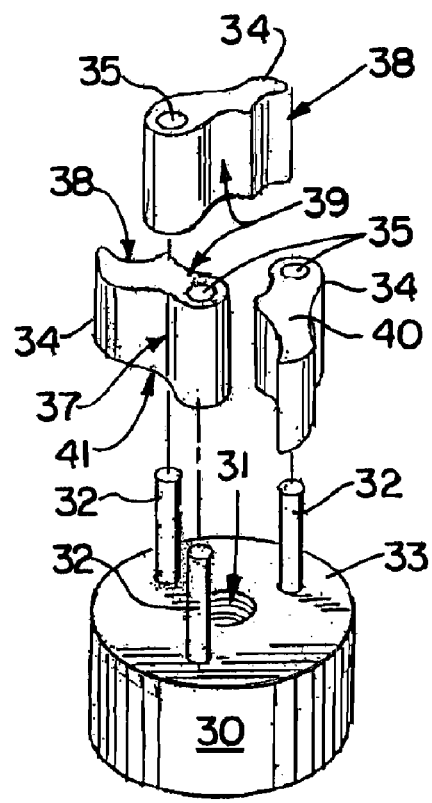
FIG. 9 is a partial exploded perspective view of the preferred embodiment of the apparatus of the present invention.

Plate 30 provides an internally threaded opening 31 and a plurality of circumferentially spaced apart pins 32. Each of the pins 32 extends radially away from opening 31 as shown in FIG. 9. Plate 30 provides a plate surface 33 from which each pin 32 extends.

Figure 7:
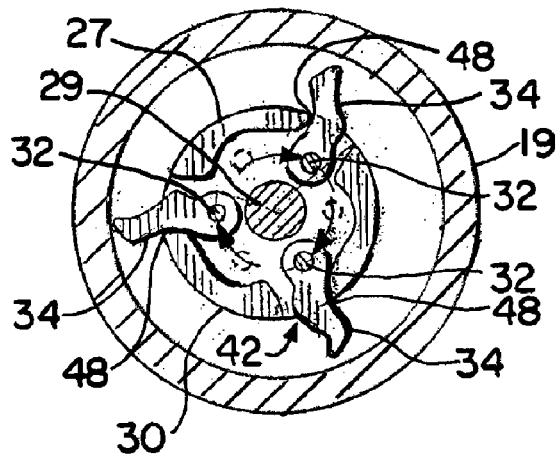
FIG. 7 is a sectional view taken along lines 7-7 of FIG. 3.
Figure 8:
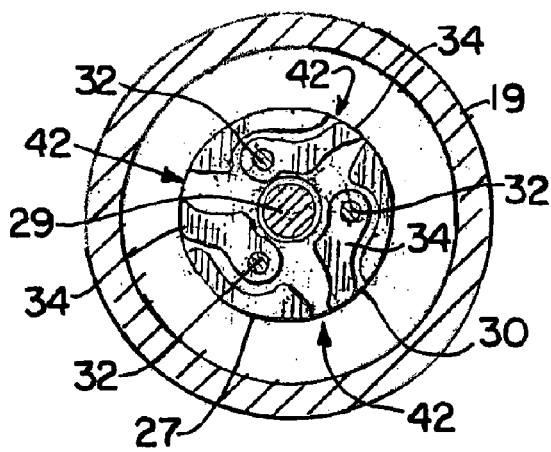
FIG. 8 is a sectional view taken along lines 8-8 of FIG. 2.

A plurality of locking arms 34 are mounted upon the pins. In the preferred embodiment, each pin 32 has a locking arm 34. Each locking arm 34 has an opening 35 that enables it to be mounted upon pin 32 as shown in FIGS. 7-9.

Each locking arm 34 has an upper surface 40 and a lower surface 41. Each locking arm 34 has a concavity 37 that engages a part of barrel 27 at the end portion of barrel 27 that is opposite oval shaped end portion 44. Concavities 38, 39 are provided on each locking arm 34 opposite concavity 37.

End portion 36 of barrel 27 provides preferably three circumferentially spaced apart radially extending slots 42. When moving to an expanded position of FIGS. 3, 4 and 7, each locking arm 34 extends through a slot 42. When moving to the extended position of FIG. 7, each locking arm 35 engages a curved edge 48 of barrel 27 end portion 36 that is next to a slot 42 as shown in FIG. 7.

Shaped end portion 44 joins to barrel 27 at shoulder 43. The shaped end portion 44 provides an oval shaped outer surface 45. Coil spring 46 fits over shaped end portion 44 and engages annular shoulder 43. Collar 47 is fitted upon shaped end portion 44 with shaft 29 and its enlarged end portion 50, which provides eyelet 49.

In order to disengage pin assembly 14 from shackle bow 11, a user pulls spring loaded release pin 51 and then pushes collar 47 in the direction of arrow 55 which allows handle 52 to be rotated. Inversely by rotating handle 52 in opposite direction once locking arms 34 are fully extended the spring 46 pushes collar 47 onto eyelet 47 which locks central shaft 29 into a fixed position with locking arms 34 extended and no amount of vibration can disengage them. Handle 52 can be any structure that enables rotation to be imparted to shaft 29. Handle 52 can be an eyelet shape having opening 53. When shaft 29 is rotated, projecting members 34 move to the retracted position of FIGS. 2 and 8, enabling pin assembly 14 to be withdrawn from bow 11 via opening 16 as indicated by arrow 54 in FIG. 2.

FIGS. 2A and 11A show an alternate arrangement for an interlocking connection between pin 14A and bow 11A. The embodiments of FIGS. 2A and 11A are the same as the preferred embodiment but for a threaded connection at 56 and at 57 between the pin 14A and the bow ends 12 and 13. The receptacle 19 in FIG. 11A has a threaded smaller diameter section 25A that is part of hollowed interior 22A. This threaded smaller diameter section 25A interlocks with an externally threaded portion 58 of pin 14A. Similarly, an externally threaded portion 18A of pin 14A forms a threaded connection 57 with internally threaded opening 16A of bow 11A. The embodiment of FIGS. 2A and 11A provides threaded connections at 56, 57 wherein the embodiment of FIGS. 2 and 11 provides unthreaded, generally cylindrically shaped openings at 15, 18 that are receptive of pin 14.

The following is a list of parts and materials suitable for use in the present invention.

PARTS LIST

| Part Number | Description |
| --- | --- |
| 10 | shackle |
| 11 | bow |
| 11A | bow |
| 12 | bow end |
| 13 | bow end |
| 14 | pin assembly |
| 14A | pin assembly |
| 15 | pin receptive opening |
| 15A | pin receptive opening |
| 16 | opening |
| 16A | opening |
| 17 | internal thread |
| 18 | internal surface |
| 18A | threaded portion |
| 19 | receptacle |
| 20 | externally threaded section |
| 21 | threaded connection |
| 22 | hollowed interior |
| 22A | hollowed interior |
| 23 | enlarged diameter section |
| 24 | smaller diameter section |
| 25 | smaller diameter section |
| 25A | threaded smaller diameter section |
| 26 | annular shoulder |
| 27 | pin barrel |
| 28 | longitudinal bore |
| 29 | shaft |
| 30 | plate |
| 31 | internally threaded opening |
| 32 | pin |
| 33 | plate surface |
| 34 | locking arm |

-continued
PARTS LIST

| Part Number | Description |
| --- | --- |
| 35 | opening |
| 36 | end portion |
| 37 | concavity |
| 38 | concavity |
| 39 | concavity |
| 40 | upper surface |
| 41 | lower surface |
| 42 | slot |
| 43 | shoulder |
| 44 | shaped end portion |
| 45 | oval shaped surface |
| 46 | spring |
| 47 | collar |
| 48 | curved edge |
| 49 | eyelet |
| 50 | enlarged end portion |
| 51 | release pin |
| 52 | handle |
| 53 | opening |
| 54 | arrow |
| 55 | arrow |
| 56 | threaded connection |
| 57 | threaded connection |
| 58 | externally threaded portion |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A shackle apparatus comprising:
   a) a bow having bow end portions, each bow end portion having an opening;
   b) a pin assembly that detachably connects to the bow, the pin assembly including a barrel having spaced apart end portions and a hollow bore that has larger and smaller diameter sections;
   c) a shaft that fits the barrel bore, the shaft having one end portion with a plate and a plurality of locking members, each locking member being pivotally attached to the plate, each locking member having a projecting portion that engages the larger diameter bore section of the barrel hollow bore;
   c) an end portion of the shaft opposite the projecting portions being rotatable;
   d) wherein rotation of the shaft in one rotational direction extends the projecting members so that they enter the larger diameter bore section and rotation of the shaft in the other direction retracting the projecting members.

2. The shackle apparatus of claim 1 wherein one of the bow end portions has an internally threaded opening, and the barrel is in two parts, one of the parts attaching to the bow at the internally threaded opening.

3. The shackle apparatus of claim 1 further comprising a receptacle fitted to the bow at a bow end, the receptacle having a bore that is of a larger diameter at least in part than the bore of the barrel.

4. The shackle apparatus of claim 3 wherein receptacle has a bore with smaller and larger diameter sections.

5. The shackle apparatus of claim 1 wherein one bow end portion carries a receptacle having a receptacle bore, the shaft connecting to the receptacle at the receptacle bore.

6. The shackle apparatus of claim 1 wherein the openings are generally cylindrically shaped.

7. The shackle apparatus of claim 1 the barrel and the shaft have the same central longitudinal axis.

8. The shackle apparatus of claim 1 wherein barrel has a cylindrically shaped portion.

9. The shackle apparatus of claim 1 wherein the barrel includes a pair of barrel sections, one barrel section being a receptacle that connects with the projecting members when the projecting members are extended.

10. The shackle apparatus of claim 9 wherein the receptacle attaches to a shackle bow end with a threaded connection.

11. The shackle apparatus of claim 1 wherein the shaft has a handle at one end portion that enables a user to rotate the shaft.

12. The shackle apparatus of claim 11 wherein the handle is an enlarged part of the shaft.

13. The shackle apparatus of claim 11 wherein the handle provides an eyelet.

14. A shackle apparatus comprising:
a) a generally U shaped bow having bow end portions, each bow end portion having an opening;
b) a pin assembly that detachably connects to the bow at the bow openings, the pin assembly including a barrel and a receptacle, the receptacle forming an attachment to one bow end at a bow opening, the other bow end being receptive of the barrel;
c) the receptacle having a bore section;
d) the barrel having a bore section;
e) a shaft that connects to the barrel and to the receptacle by occupying the bore sections, the shaft having a plurality of locking members, each locking member being pivotally attached to the shaft, each locking member having a projecting portion that engages the receptacle bore section;
f) rotation of the shaft relative to the barrel extending the projecting members and retracting the projecting members;
g) the receptacle bore section being enlarged to receive the projecting members.

15. The shackle apparatus of claim 14 wherein one of the bow end portions has a threaded opening.

16. The shackle apparatus of claim 14 wherein the receptacle is attached to the bow at the threaded opening.

17. The shackle apparatus of claim 14 further comprising a spring that urges the projecting members to engage the receptacle in a locking position.

18. The shackle apparatus of claim 14 wherein the shaft has an end portion with a plate.

19. The shackle apparatus of claim 18 wherein the projecting members are movably mounted to pins that are attached to the shaft.

20. The shackle apparatus of claim 14 wherein the pins are generally parallel.

\* \* \* \* \*